Dec. 8, 1964   R. W. WARING   3,160,587
FILTERING SYSTEM

Filed Dec. 4, 1958   2 Sheets-Sheet 1

INVENTOR.
ROBERT W. WARING
BY
ATTORNEY

Dec. 8, 1964   R. W. WARING   3,160,587
FILTERING SYSTEM

Filed Dec. 4, 1958   2 Sheets-Sheet 2

INVENTOR.
ROBERT W. WARING
BY
ATTORNEY 3,160,587
FILTERING SYSTEM
Robert W. Waring, 197 Old Post Road, Fairfield, Conn.
Filed Dec. 4, 1958, Ser. No. 778,196
4 Claims. (Cl. 210—116)

The present invention relates to filtering systems for machine tools and the like, and particularly to a new and improved filtering system that consumes a minimum of floor space, provides easily accessible, disposable filtering media, and which is capable of maintaining a coolant or lubricating system substantially free of solid contaminants for the life of the machine with which it is employed.

The principal object of this invention is to provide a compact filtering system that provides a maximum of filtering surface and consumes a minimum of floor space.

Another object of the invention is to provide such a filtering system that employs disposable filtering bags through which the liquid to be filtered passes.

Another object of this invention is to provide such a system wherein the loaded bags may be easily removed and replaced without disturbing the continued operation of the system.

Another object of the invention is to provide such a system that is continuously operable during the operation of the machine to which it is applied, without automatic conveying or transporting mechanism for the filtering media.

Another object of the invention is to provide such a system wherein the volume that can be handled may be multiplied without increasing the floor space consuming capacity of the system.

Another object of the invention is to provide such a system in which the filtering area of the disposable filters is maintained substantially vertical throughout the filtering process.

One aspect of the invention may be to provide a relatively short, deep and narrow sump so that a minimum of floor space will be consumed by it, and to mount on the top of the sump the entire filtering system.

In another aspect of the invention, removable housing members having pockets formed by walls provided with vertically effective fluid passage means are adapted to receive filter bags into which the coolant or liquid to be filtered may be directed. These housing members may be of a length relative to the sump to provide only enough additional room over the sump to accommodate a pump and motor unit. The housing members may be very narrow in order to accommodate a plurality on top of the sump and as high as is practical consistent with the return of the coolant from the machine to which the system is applied.

In another aspect of the invention, an upright means containing upper and lower cross bars may be located along the longitudinal axis of the sump near each end thereof. These cross members may support the containers in a vertical position over the sump and yet permit their individual movement to an angularly disposed position where they may be fixed for replacing the disposable filter bags adapted to be housed therein.

In still another aspect of the invention, the housing members may be provided with only one side wall, a stationary wall having vertically effective fluid passage means being fixed to the central upright means forming the inner wall of each housing on opposite sides of the upright means. In this way, the weight of the liquid being treated does not cause interlocking between the walls having the vertically effective fluid passage means and the disposable bag, thereby facilitating the ready removal of the bag.

In still another aspect of the invention, a plurality of such housing members may be stacked on each side of the central upright means, should it be desirable to increase the filtering capacity of the system. Furthermore, in such instances an auxiliary storage means may be supported on the top of the machine or suspended thereover for handling the additional quantity of liquid, from which storage means the liquid may gravitate to the point of use.

The above, other objects and novel features of the new and improved filtering system will become apparent from the following specification and accompanying drawings which are merely exemplary.

Figure 1:
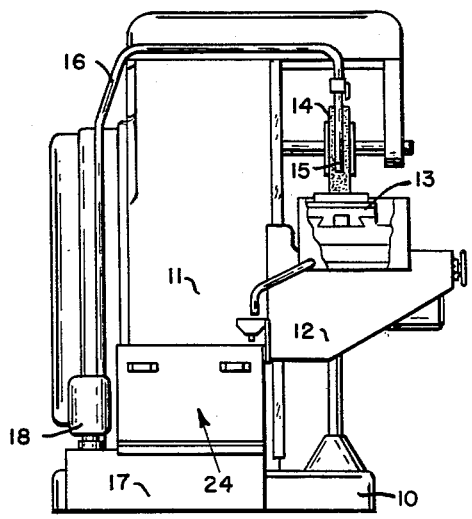
FIG. 1 is an elevational view of a grinding machine to which the filtering system of this invention has been applied.

Referring to the drawings, and particularly to FIGS. 1, 3, 4 and 5, the principles of the invention are shown as applied to a grinding machine including a base 10 having a standard 11 on which the usual knee 12 is mounted for vertical movement to adjust a work supporting table 13 relatively to a grinding wheel 14 on which a jet of grinding coolant is directed from a nozzle 15 that is supplied from a line 16. The table 13, of course, is adapted to be reciprocated in the usual manner so that the work held thereon will be acted upon by the grinding wheel 14. The line 16 may lead from a sump 17 or reservoir containing filtered coolant.

Figure 4:
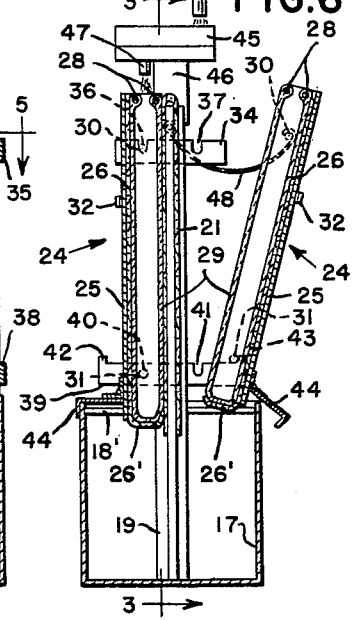
FIG. 4 is a sectional elevational view taken substantially along line 4—4 of FIG. 3.
Figure 7:
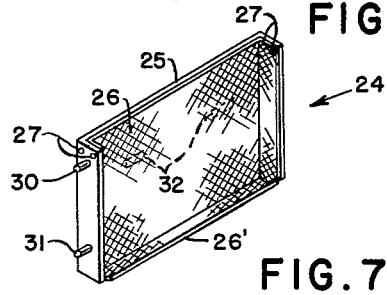
FIG. 7 is a perspective view of a detail of the invention.

Referring to FIGS. 1 and 4, although the dimensions of the sump 17 may be any measurement, in order to conserve floor space the length of the sump 17 is shown as less than the depth of the machine which it serves; the width of the sump 17 may be less than about one-third its length, while the depth of the sump may be about equal to its width. The sump 17 may be made of sheet metal having a bottom and four side walls with an open top. A vertically arranged, motorized pump 18 may be located at one end of the sump 17 and supported on a cover 18' that closes this end of the sump. The outlet of pump 18 may be connected to the line 16 leading to the nozzle 15 in the vicinity of the grinding wheel 14. T-members 19 and 20 may be mounted along the longitudinal axis of the sump 17 with their central webs facing each other and in alignment along said axis. The T-member 19 may be fixed to the sump 17 at the bottom thereof and to the exposed edge of the cover 18′, while the member 20 may be fixed to the one end wall of the sump 17.

A wall 21 having vertically effective fluid passage means may be provided along this longitudinal axis of sump 17 extending from within the sump upwardly a distance consistent with the location of return of the coolant from the work performing operation. While the wall 21 having vertically effective fluid passage means may take many forms, it is shown as a relatively coarse mesh screen. For example, the wall 21 could be made of a corrugated material with the channels formed by the corrugations extending vertically. The wall 21 may be formed by bending a sheet of such screening in half, back on itself, so that the spacing between the two layers of screen will be approximately equal to the thickness of the webs of the T-members 19 and 20. In order to ensure rigidity to the wall 21, stiffener members 22 and 23 may be slid between the screen layers and be fixed thereto by welding or other means. The assembled wall 21 may then be slid downwardly along the webs of the T-members 19 and 20 to the desired location and fixed to said members by welding or otherwise.

Disposable filtering bag housing members 24 may be mounted on each side of the wall 21. The members 24 may include a channel-shaped sheet metal member 25 having three walls and open at each end. The member 25 may also include vertically effective fluid passage means, and in the embodiment shown it takes the form of a liner 26 made from the same screening used in making wall 21. The liner 26 may be fixed to the interior of the member 25, and it may include a bottom screen wall 26′. Aligned spaced holes 27 may be provided at the top of the side walls of the members 24 for receiving rods 28 adapted to be threaded through a hem, or looped portion, at the top of each side of a disposable filtering bag 29.

Figure 8:
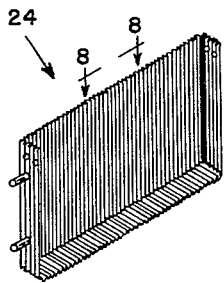
FIG. 8 is a perspective view of a modified form of a detail of the invention.
Figure 9:
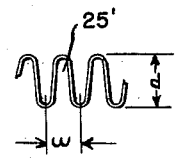
FIG. 9 is an enlarged section taken substantially along line 8—8 of FIG. 8.
Figure 5:
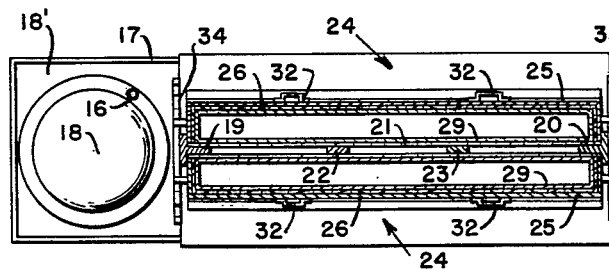
FIG. 5 is a top plan view of the apparatus shown in FIG. 3.

Referring to FIGS. 8 and 9, the member 24 may be made from a sheet of corrugated metal or other thin, rigid material having corrugations formed as shown in FIG. 9 where the depth "$d$" of the corrugations is substantially greater than the width "$w$" so that the material of the disposable bags 29 will not fill the corrugations but will provide vertically effective fluid passage means 25′.

Aligned trunnions 30 and 31 may be located near the bottom and top of the side walls of members 24, and handles 32 may be attached to the outer backing wall of the members 24.

Figure 3:
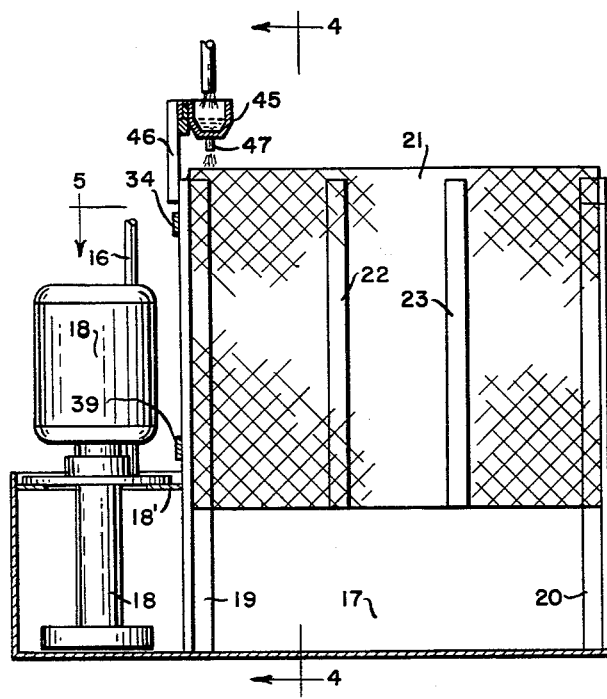
FIG. 3 is a sectional elevational view of a filtering apparatus to which the principles of the invention have been applied, and taken substantially along line 3—3 of FIG. 4.

Referring to FIGS. 3 and 4, cross members 34 and 35 may be fixed near the top thereof to the T-members 19 and 20 at the same elevation. These cross members may include notches 36 and 37 for a purpose to be described later. Near the top of the sump 17, additional cross members 39 and 38 may be fixed to the T-members 19 and 20 at the same elevation. The members 38 and 39 may include notches 40 and 41 as well as end abutment elements 42 and 43.

One of the housing members 24 may be mounted on each side of the center wall 21 so that its outer sheet metal wall faces outwardly and the open portion between the walls of the channel member 25 may face the central wall 21. The housing members may be held vertically by trunnions 30 and 31 resting within the notches 37 and 41. A cover 44 may be hinged to the housing members 24 in position to cover the remaining portion of the sump 17 that is not covered by the housing members 24. In its vertical position, the disposable filter bag 29 may be inserted within housing member 24 and be supported therein by rods 28 that pass through an open ended hem in the top open end of the bag 29.

A trough 45 may be adjustably supported on a bracket 46 mounted on the T-member 19, and it may include a spout 47 for directing the coolant that is collected during a grinding operation to either of the filter bags within the housing members 24, depending upon the position of the trough along the support 46.

When it is desired to change one of the filter bags 29, due to loading of its pores with filtered solids, the housing 24 containing that bag may be lifted slightly to clear slots 37 and 41, and slid along the cross member 39 until its trunnions 31 engage abutments 43 (FIG. 4). A chain or cord 48 may be connected to the T-member 19 or 20 and to one of the trunnions 30 to support the housing member 24 in an angular position facilitating the removal of the loaded bag after the liquid therein has drained into the sump 17.

Figure 2:
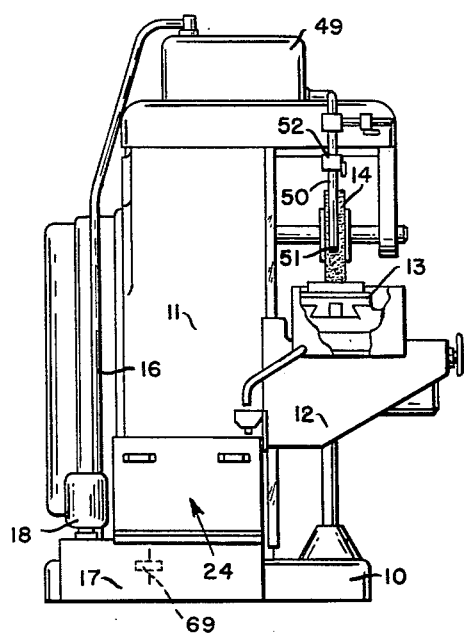
FIG. 2 is an elevational view of a grinding machine to which a modified form of the filtering system of this invention has been applied.
Figure 6:
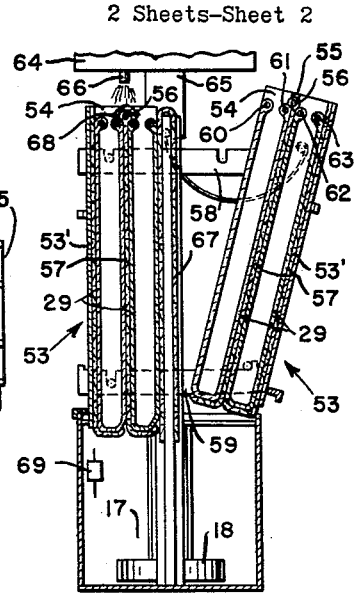
FIG. 6 is a sectional elevational view similar to FIG. 4, and showing a modified form of the invention.

Referring to FIGS. 2 and 6, the principles of the invention are shown as applied to a machine tool similar to the one shown in FIG. 1, but wherein a much larger flow of coolant is required than can be handled by the single filter bag 29. In this case, the volume of coolant per unit of time is much greater than that capable of being filtered with the single bag 29 per housing 24, as shown in FIG. 4.

In this embodiment, the line 16 instead of being directed to the grinding operation leads to an auxiliary sump 49 remotely located relatively to sump 17 and preferably at an elevation from which the coolant can gravitate to the machining operation. In the embodiment disclosed, it is shown as being supported on the top of the standard 11 of the machine. An outlet line 50 may lead from the auxiliary sump 49 to a nozzle 51 that can be directed onto work. A valve 52 may be provided in line 50 for controlling the flow of coolant to the working operation.

Referring to FIG. 6, there is shown a modified form of the filtering arrangement for providing twice as much filtering area with no increase in the size of the sump 17. In this embodiment, the disposable filtering bag housing member 53 may be similar to the member 24 of FIG. 4, except that the transverse dimensions of the two parallel walls 54 (only one being shown) are twice as great as the corresponding dimension of the parallel side walls of the member 24. The lining 53′ of the member 53 is substantially the same as the liner 26 of member 24 in that its transverse dimension is the same as the liner 26 and, therefore, extends over only about one-half of the walls 54 of member 53. It is, of course, within the scope of equivalents to employ the corrugated wall structure previously referred to, or any other wall structure having vertically effective fluid passage means.

At the top of the walls 54, in the center thereof and in aligned relation, U-shaped bearings 55 (only one being shown) may be provided for removably receiving trunnions 56 (only one being shown) connected to each side of another member 57 which may be similar to the liner 53′, but instead of being fixed to the member 53 may be pivotally and removably mounted within bearings 55.

Cross members 58 and 59 similar to, but longer than the corresponding cross members 34 and 39 of FIG. 4 may be provided in the embodiment of FIG. 6, and the operations of the members 53 in tilting them for facilitating removal of the disposable filtering bags is the same as that described regarding the embodiment of FIG. 4.

There may be provided near the top of the side walls 54, four pairs of aligned holes 60, 61, 62 and 63 for receiving rods that are threaded through the hems at the top of the disposable filter bags 29.

A trough 64 may be adjustably supported on a bracket 65 mounted on one of the T-members of the embodiment of FIG. 6, and it may include a spout 66 for directing the coolant that is collected during a machining operation to either side of the center screen wall 67 that is identical with wall 21 of FIG. 4. A deflecting member 68 may be located over the trunnions 56 for deflecting the discharge from spout 66 to two bags 29 simultaneously on one side of the screen wall 67.

The apparatus in the condition shown in FIG. 6 discloses the righthand member 53 as being tilted to its open position where it is draining oil or coolant into sump 17 while the collected coolant is being discharged into the lefthand member 53. When the bags 29 of the righthand unit are drained and ready to be replaced, the lefthand bag 29 of the righthand member 53 is first removed, after which the screen liner 57 is removed by lifting trunnions 56 from bearings 55, thus exposing the righthand bag 29 of member 53 which may then be removed in the same manner as such bags were removed in the embodiment of FIG. 4.

New bags 29 may then be inserted into the pockets formed by the screen liners 57 and 53' and supported therein by rods being threaded through the hems at the upper end of said bags and through the pairs of holes 60, 61, 62 and 63. The righthand member 53 may then be located and fixed in vertical position against the center screen wall 67 in the same way that the member 24 is fixed against wall 21 of FIG. 4.

In the embodiment shown in FIGS. 2 and 6, a float switch 69 may be provided in series with the motor of pump 18 so that when the level of coolant within sump 17 reaches it, pump 18 will be energized and unload the sump 17, transferring the liquid to the auxiliary sump 49. Alternatively the float switch 69 may operate a high level alarm in case of pump failure. From the foregoing it is evident that the sump 17 need not be capable of handling any specific quantity of liquid and, therefore, may consume as little floor space as is required to support the vertically disposed filter bag housings 24, 53, and pump 18.

Although the various features of the new and improved coolant or filtering system have been shown and described in detail to fully disclose several embodiments of the invention, it will be evident that numerous changes may be made in such details, and certain features may be used without others without departing from the principles of the invention.

What is claimed is:

1. In a filtering system for machine tools, a sump having an open top; a pump having an outlet connected to conduit means adapted to supply a liquid to a point of use on a machine tool, said pump being located within said sump and having an inlet below the normal level at which liquid is to be confined therein; a wall having vertically effective fluid passage means attached to said sump and located within a plane along substantially the centerline of said sump, said wall extending above and within the confines of the open top of said sump; separate vertically disposed housings on each side of said wall, each housing comprising a member having a side wall joined to spaced, parallel end walls, said walls being provided with vertically effective fluid passage means, and a bottom wall fixed to said member and provided with fluid passage means; means between the parallel walls of the member and the end thereof opposite said bottom wall for supporting disposable filter bags within said housings; filter bags within said housings; means on the exterior of said housings for supporting them on means located on either side of the wall along the centerline of said sump; and conduit means for returning liquid from said point of use on the machine tool selectively to the filter bags in said housings, whereby each of said housings may be separately effective while another is being conditioned by the replacement of its disposable filter bags.

2. In a filtering system for machine tools, a sump having an open top; a pump having an outlet connected to conduit means adapted to supply a liquid to a point of use on a machine tool, said pump being located within said sump and having an inlet below the normal level at which liquid is to be confined therein; a vertically extending, perforated wall attached to said sump and located along substantially the centerline of said sump, said wall extending above and within the confines of the open top of said sump; housing members mounted on each side of said perforated wall, each housing member comprising an open ended channel-shaped member having spaced parallel walls; a screen liner fixed to, and located interiorly of said channel member and having parallel wall portions covering only a portion of the parallel walls of said channel member as well as extending over only a portion of the one open end of said channel member; a screen member similar to said liner member; means for removably mounting said screen member on the parallel walls of said channel member in a manner such that the screen member and screen liner form pockets for receiving disposable filter bags; filter bags within said pockets; means between the parallel walls of said channel member and at the end thereof opposite the end covered by said screen liner and screen member for supporting the disposable filter bags within said pockets; and means for supporting said housing members in a vertical and an inclined position; and conduit means for returning liquid from said point of use in the machine tool selectively to the filter bags in said pockets, whereby each of said housings may be separately effective while another is being conditioned by the replacement of its disposable filter bags.

3. In a filtering system for liquid employed with machine tools, a main relatively small sump having an open top; a pump located within said sump and having an inlet below the normal level at which liquid is to be confined therein; means for operating said pump; an auxiliary relatively large sump located remotely from said main sump and supplied by liquid from said main sump by the action of said pump; conduit means connecting the outlet of said auxiliary sump to a point of use on a machine tool; vertically disposed housing members having open tops and bottoms extending above and within the confines of the open top of said main sump for receiving disposable filter bags; filter bags within said housing members; conduit means for delivering liquid from said point of use on a machine tool selectively to said filter bags; and level responsive means within said main sump and connected to the means for operating said pump, whereby said pump is caused to deliver liquid from said small sump to said auxiliary sump when the level in the small sump reaches a predetermined value.

4. In a filtering system for liquid employed with machine tools, a main relatively small sump having an open top; an electric motorized pump fixed to the top of said sump and covering a portion thereof, said pump having an inlet below the normal level at which liquid is to be confined within said pump; an auxiliary relatively large sump located remotely from said main sump; conduit means connecting said large sump to said pump; conduit means leading from said auxiliary sump to a point of use of a machine tool; a vertically extending perforated wall located along substantially the longitudinal centerline and extending over the portion of said open sump not covered by said pump; vertically disposed housing members having open tops and bottoms extending above and within the confines of the open top portion of said sump not covered by said pump and in cooperating position relatively to said perforated wall, each of said housing members comprising an open ended channel-shaped member having spaced parallel walls; a screen liner fixed to, and located interiorly of said channel member and having parallel wall portions covering only a portion of the parallel walls of said channel member as well as extending over only a portion of the one open end of said channel member; a screen member similar to said liner member; means for removably mounting said screen member on the parallel walls of said channel member in a manner such that the screen member and screen liner form pockets for receiving disposable filter bags; means between the parallel walls of said channel member and at the end thereof opposite the end covered by said screen liner and screen member for supporting the disposable filter bags within said pockets; means for delivering liquid from said point of use selectively to said filter bags; and level responsive means within said main sump and connected to the motor of said motorized pump, whereby said pump is caused to pump said liquid to said auxiliary sump when the level within said small sump reaches a predetermined value.

References Cited in the file of this patent

UNITED STATES PATENTS

| | | |
|---|---|---|
| 385,666 | Hadley | July 3, 1888 |
| 435,096 | Hoops | Aug. 26, 1890 |
| 731,902 | Hodgkin | June 23, 1903 |
| 1,401,199 | Simpson et al. | Dec. 27, 1921 |
| 2,100,951 | Glass et al. | Nov. 30, 1937 |
| 2,201,628 | McCormick et al. | May 21, 1940 |
| 2,359,138 | Martin | Sept. 26, 1944 |
| 2,441,681 | Werder | May 18, 1948 |
| 2,489,362 | Bastrup | Nov. 29, 1949 |
| 2,551,312 | Bokich | May 1, 1951 |
| 2,574,251 | Dinley | Nov. 6, 1951 |
| 2,619,231 | Abbott | Nov. 25, 1952 |
| 2,765,916 | Montgomery et al. | Oct. 9, 1956 |
| 2,765,924 | Dinley | Oct. 9, 1956 |